United States Patent [19]
Lin et al.

[11] Patent Number: 5,609,070
[45] Date of Patent: Mar. 11, 1997

[54] CRANK COVER ASSEMBLY FOR A BICYCLE

[76] Inventors: King-Chen Lin, No. 173, Kuei Suei Street; Ming-Chang Lin, No. 66, Huai An Street, both of Kaohsiung City, Taiwan

[21] Appl. No.: 509,727

[22] Filed: Aug. 1, 1995

[51] Int. Cl.⁶ .................................................... B62M 3/16
[52] U.S. Cl. ........................................ 74/594.1; 74/558.5
[58] Field of Search ................................ 74/594.1, 608, 74/609, 612, 558.5; 474/151, 144

[56] References Cited

U.S. PATENT DOCUMENTS

| | | | |
|---|---|---|---|
| 594,047 | 11/1897 | Welles et al. | 74/594.1 |
| 3,789,696 | 2/1974 | Beam, III | 74/594.1 |
| 3,922,929 | 12/1975 | Marchello | 74/594.1 |
| 4,807,491 | 2/1989 | Stuckenbrok | 74/594.1 |
| 5,161,430 | 11/1992 | Febey | 74/594.1 |

FOREIGN PATENT DOCUMENTS

| | | | |
|---|---|---|---|
| 931379 | 5/1951 | France | 74/594.1 |
| 1034221 | 7/1953 | France | 74/594.1 |
| 1230096 | 9/1960 | France | 74/558.5 |
| 2425168 | 1/1980 | France | 74/609 |
| 430123 | 2/1948 | Italy | 74/594.1 |

*Primary Examiner*—Charles A. Marmor
*Assistant Examiner*—Mary Ann Battista
*Attorney, Agent, or Firm*—Morton J. Rosenberg; David I. Klein

[57] ABSTRACT

A crank cover assembly for a bicycle which includes a molded shell member and a molded leaf member which cooperatively encase a forged crank of a bicycle. The molded shell and molded leaf are configured to substantially perform to the outer contour of the forged crank, and each has formed therethrough openings substantially aligned with through openings in the forged crank. The shell and leaf members are coupled together by use of fastening mechanisms such as a catch-tongue joint or a hot-melted joint.

4 Claims, 4 Drawing Sheets

CRANK COVER ASSEMBLY FOR A BICYCLE

BACKGROUND OF THE INVENTION

1. Field of the Invention

The present invention relates to a crank cover assembly for a bicycle, and more particularly, to a combination of a pre-molded shell and a pre-molded leaf for covering a bicycle crank.

2. Description of the Related Art

In forming a prior art bicycle crank, the crank is first molded through metal casting or forging. The crank itself is molded to a specified shape, color, and luster. As shown in FIG. 6, crank A having a shaft hole A1 and a threaded hole A2 at longitudinally opposed ends thereof, and having the desired shape is thus formed. To vary the crank color and the overall appearance of the bicycle, a plastic outer coat is formed onto prior art cranks after they have been forged. The plastic outer coat is molded in the mold holding the forged metal crank. In practice, this process is plagued by the following shortcomings:

1. During molding, burn marks are often formed on the shaft hole and the threaded hole of the crank. Great time and effort are expended to individually scrape out those marks. Consequently, the production process is rendered complex and inefficient, and production costs are increased.
2. The crank is first formed by forging before the plastic outer coat is formed thereon by molding. The covering plastic coat may only be formed after the forging process is completed. Thus, production of the entire crank unit consumes much time, and inefficient productivity results.
3. Due to the weight of a metal crank and relatively low strength of plastic in the molding, damage to the plastic outer coat tends to result quite readily during removal of the crank from the mold.
4. If the configuration of the plastic outer coat or crank is to be changed, the mold must also be changed, causing the process to exhaust much time and increase production costs.

In view of the above-mentioned and other shortcomings of conventional plastic coated cranks, the object of the present invention is to provide a process that separates the crank forging and plastic molding processes to prevent the unnecessary consumption of resources and occurrence of errors in the molding process, while providing a convenient means by which to change a given crank's appearance.

SUMMARY OF THE INVENTION

The present invention provides a crank cover assembly for a bicycle. The crank cover assembly includes a molded shell and a molded leaf for cooperatively covering a forged bicycle crank while conforming to the contour of that forged crank. The crank cover assembly is formed by a molding process which may proceed independently of the crank forging process. The pre-molded shell and the pre-molded leaf may be fastened together by a hot-melting joint or a catch-prong joint so as to lockingly cover the forged metal crank.

DESCRIPTION OF THE PREFERRED EMBODIMENTS

Figure 1:
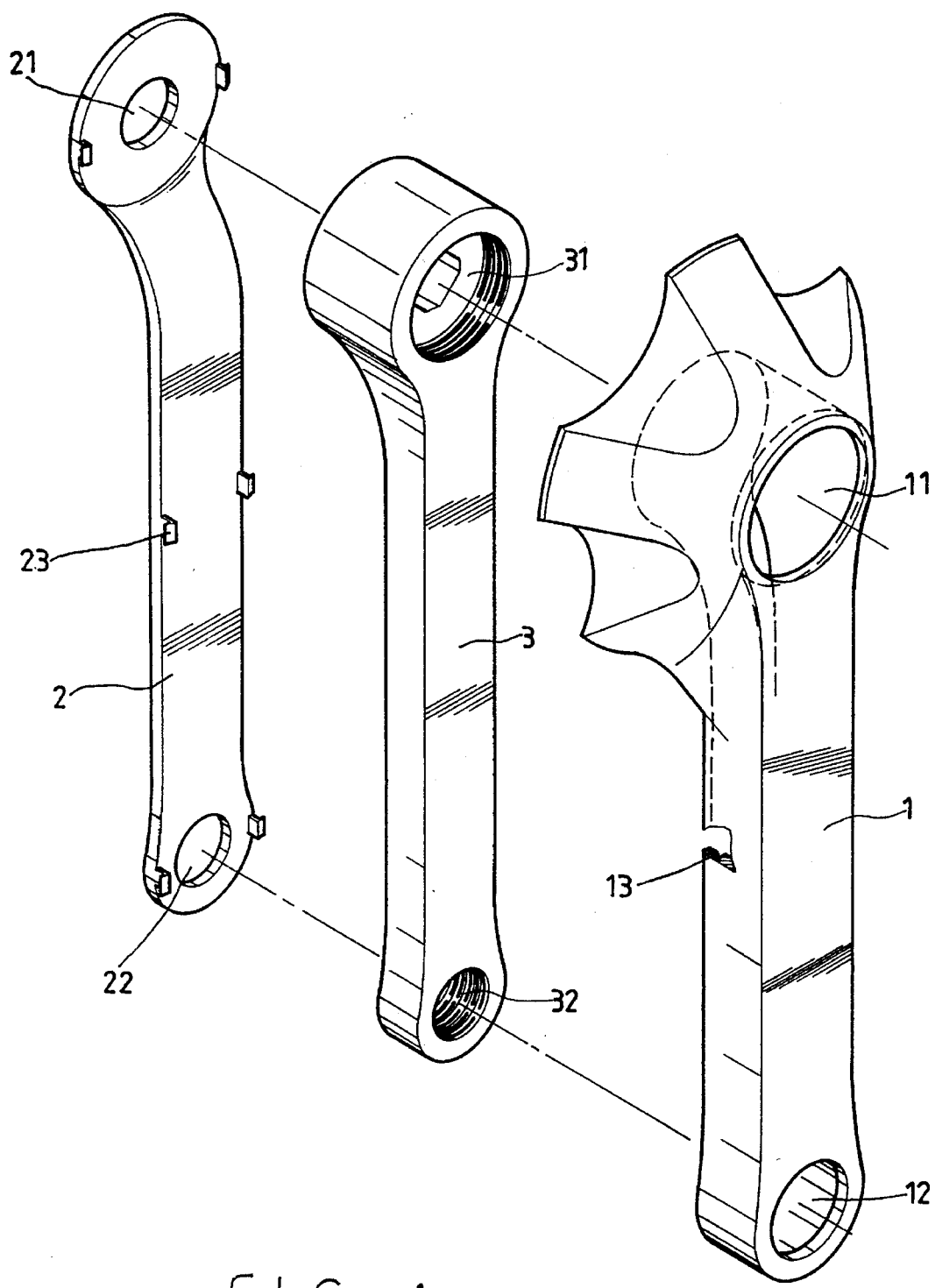
FIG. 1 is an exploded perspective view showing a preferred embodiment of the present invention.

Referring to FIG. 1, the present invention preferably includes a shell 1, a leaf 2, and a forged crank 3. The shell 1 has a hollow cavity adapted to conform to the external contour of the forged metal crank 3. The shell 1 has formed therethrough at longitudinally opposed end portions thereof a pair of openings 11, 12 which align with the shaft hole 31 and the threaded hole 32 of the forged crank 3. A plurality of catches 13 are formed on the internal side walls near the bottom opening 12.

The leaf 2 is shaped to cover the opening of the cavity of the shell 1. The leaf 2 has formed therein two through openings 21, 22 at longitudinally opposed ends thereof. The leaf 2 also has formed on its periphery a plurality of tongues 23 adapted to engage catches 13 of the shell 1 to join leaf 2 therewith.

Figure 2:
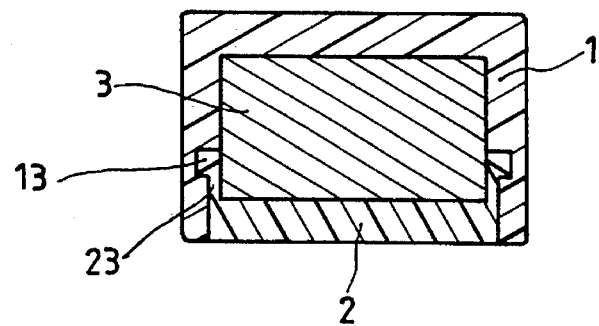
FIG. 2 is a cross-section view of the preferred embodiment of the present invention shown in FIG. 1.

Referring to FIG. 2, the forged crank 3 is received into the cavity of the shell 1, and is then covered by the leaf 2 to be fully encased between the two members. The tongues 23 of the leaf 2 engage the catches 13 of the shell 1 to lock the assembly together.

Figure 4:
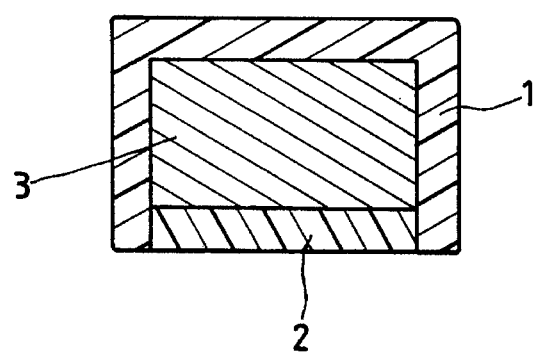
FIG. 4 is a cross-section view of the alternate embodiment of the present invention shown in FIG. 3.
Figure 3:
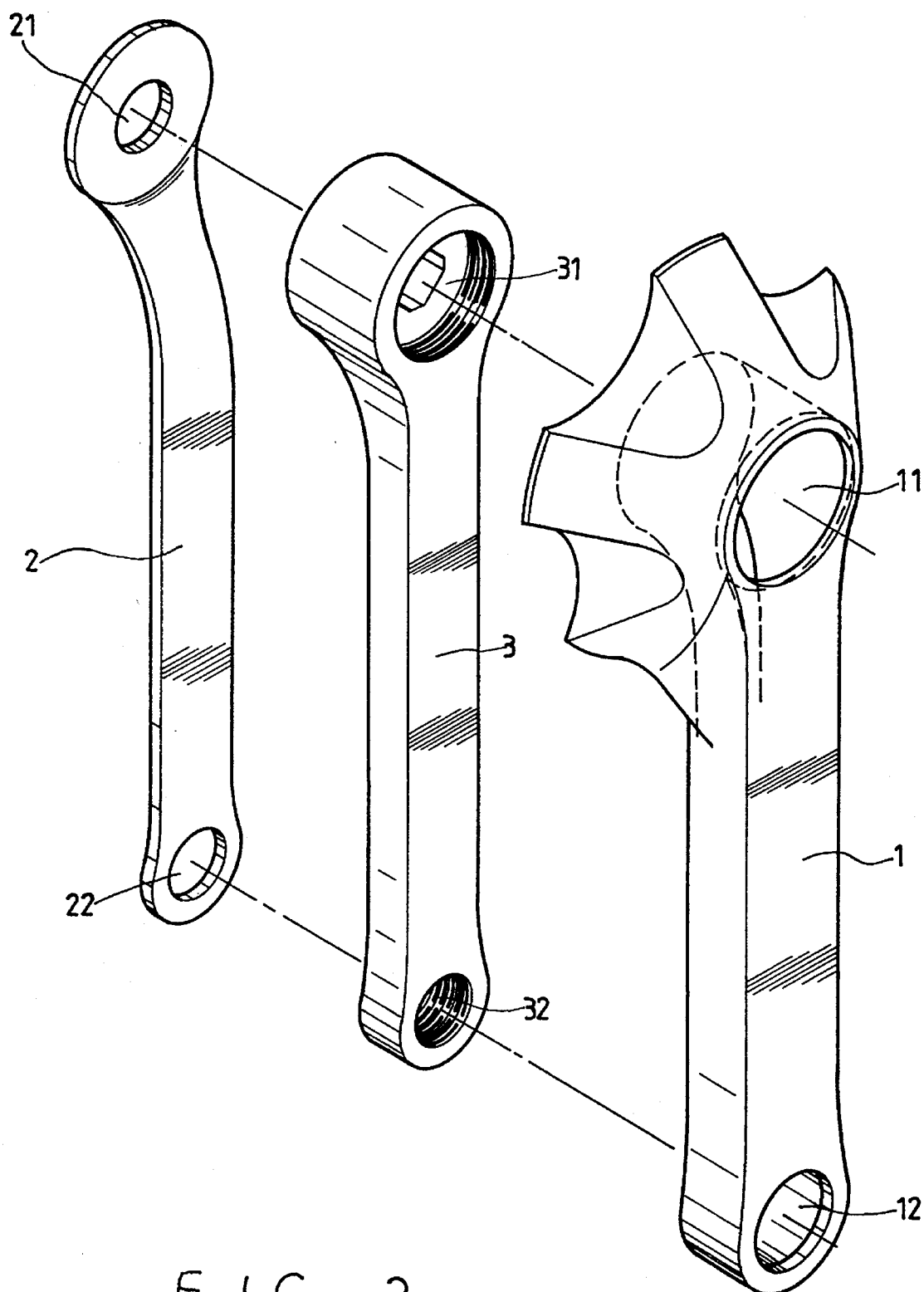
FIG. 3 is an exploded perspective view showing an alternate embodiment of the present invention.
Figure 6:
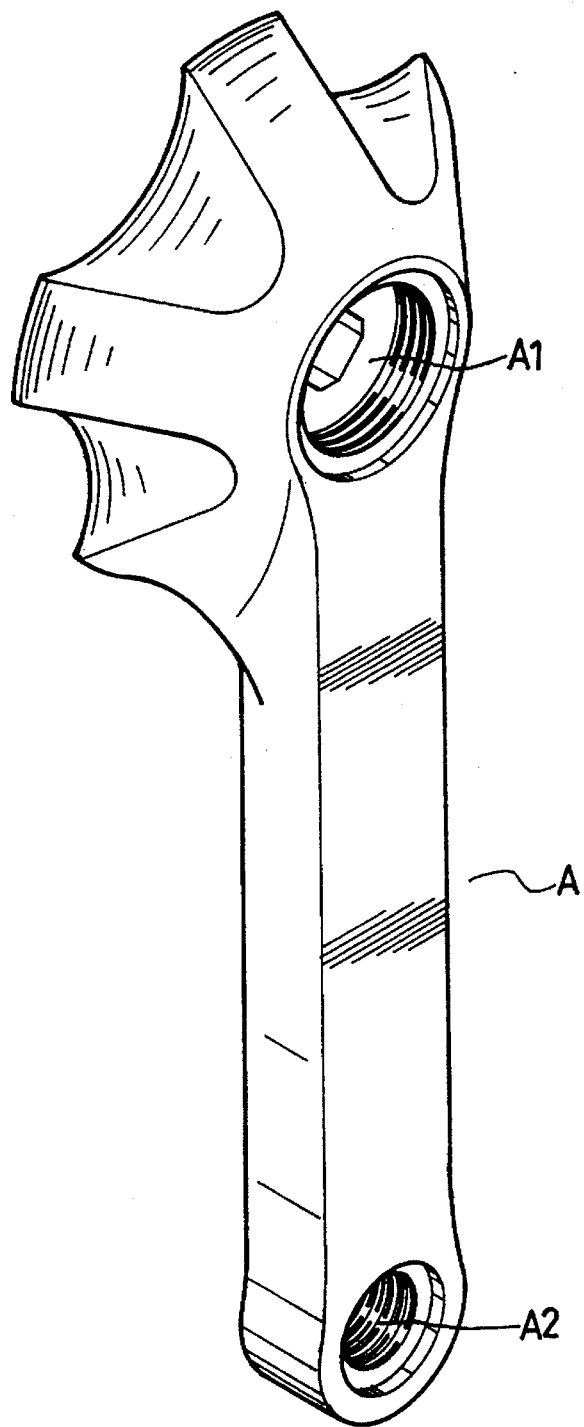

Referring to FIG. 3, there is shown an alternate embodiment of the present invention, in which the catches 13 of the shell 1 and the tongues 23 are not formed. The leaf 2 is simply inlaid to cover the opening of the shell 1 as shown in FIG. 4, the two members being fastened together by forming a hot-melting joint therebetween.

Figure 5:
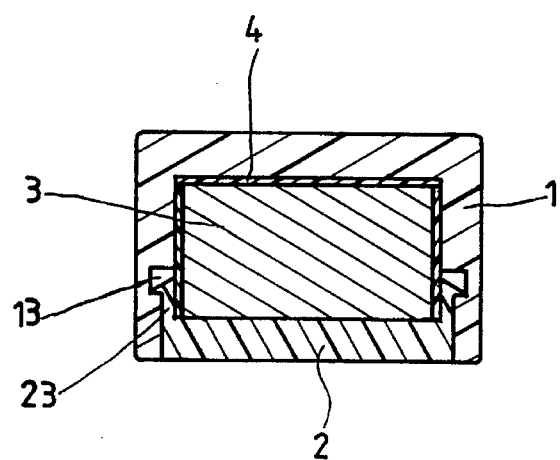
FIG. 5 is a cross-section view of the preferred embodiment of the present invention shown an FIG. 1 including a bush member; and, FIG. 6 is a perspective view of a prior art crank.

In the embodiment of FIG. 5, a bush 4 is inserted between the shell 1 and the forged crank 3 to occupy any spaced left therebetween. This makes for a-tightly assembled unit.

I claim:

1. A crank cover assembly covering a forged bicycle crank having at least one through hole comprising:

(a) a shell member covering an outer portion of said bicycle crank, said shell member having formed therein an elongate cavity receiving therein at least said outer portion of said bicycle crank; said shell member having formed therethrough at least one opening, said opening substantially aligning with one said bicycle crank through hole when said outer portion of said bicycle crank is received in said cavity; and, (b) a leaf member coupling with said shell member to cooperate therewith to substantially encase said bicycle crank, said leaf member having formed therein at least one through opening, said through opening substantially aligning with said shell member opening when said leaf member is coupled to said shell member.

2. The crank cover assembly as recited in claim 1 wherein each of said shell and leaf members includes a pair of longitudinally opposed distal end portions, said shell member opening being formed through said shell member adjacent each of said distal end portions thereof, said through opening being formed in said leaf member adjacent each of said distal end portions thereof.

3. The crank cover assembly as recited in claim 1 wherein said shell member and said leaf member are adapted to be coupled together by catch-tongue joint means.

4. The crank cover assembly as recited in claim 1 including a removable bush member inserted within said cavity of said shell member, said bush member being adapted to substantially occupy a spatial void formed between said outer portion of said bicycle crank and said shell member when said outer portion of said bicycle crank is received within said cavity of said shell member.

\* \* \* \* \*